(12) United States Patent
Brown

(10) Patent No.: US 11,587,115 B2
(45) Date of Patent: Feb. 21, 2023

(54) SYSTEM AND METHODS FOR FACILITATING CONTENT PROMOTION TRANSACTIONS BETWEEN CONTENT PROMOTERS AND ARTISTS

(71) Applicant: BRKR.IO, Inc., Tallahassee, FL (US)

(72) Inventor: Ameer Brown, Tallahassee, FL (US)

(73) Assignee: BRKR.IO, Inc., Tallahassee, FL (US)

( * ) Notice: Subject to any disclaimer, the term of this patent is extended or adjusted under 35 U.S.C. 154(b) by 0 days.

(21) Appl. No.: 17/192,695

(22) Filed: Mar. 4, 2021

(65) Prior Publication Data

US 2021/0334849 A1   Oct. 28, 2021

Related U.S. Application Data

(60) Provisional application No. 63/014,630, filed on Apr. 23, 2020.

(51) Int. Cl.
| | |
|---|---|
| *G06Q 30/02* | (2012.01) |
| *G06Q 30/0251* | (2023.01) |
| *G06Q 20/10* | (2012.01) |
| *G06Q 30/0273* | (2023.01) |

(52) U.S. Cl.
CPC ......... *G06Q 30/0252* (2013.01); *G06Q 20/10* (2013.01); *G06Q 30/0264* (2013.01); *G06Q 30/0273* (2013.01)

(58) Field of Classification Search
None
See application file for complete search history.

(56) References Cited

U.S. PATENT DOCUMENTS

| | | | |
|---|---|---|---|
| 2012/0124619 A1* | 5/2012 | Rowe | G06Q 30/0242 725/32 |
| 2015/0161683 A1 | 6/2015 | Pegross | |
| 2016/0098746 A1 | 4/2016 | Lewis et al. | |

(Continued)

OTHER PUBLICATIONS

Screen Captures from YouTube Video clip entitled "Spinfire DJ—Accept a Spin Tutorial", 3 pages, uploaded on Jun. 21, 2017 by user "Spinfire App", retrieved from https://www.youtube.com/watch?v=64VN1ulXwNQ (hereinafter "Spinfire1") (Year: 2017).*

(Continued)

*Primary Examiner* — Sam Refai
(74) *Attorney, Agent, or Firm* — Perkins Coie LLP

(57) ABSTRACT

A system and methods for facilitating transactions relating to slots in a content promoter's performance. The system allows content promoters to publish available slots in their performances and receive submissions from artists requesting their content be presented in those slots. The system facilitates transactions between promoters and artists using an escrow and "proof of play" system. The escrow system charges an artist in advance for content submitted to be presented, but holds payment of those charges until after the promoter has presented the content and proof of play has been confirmed. Proof of play may be directly confirmed by the artist, may be confirmed by the system, or may be provided to the artist in an audiovisual recording made by the promoter. The escrow and proof of play system helps protect promoters and artists against potential default by either party to the transaction.

17 Claims, 13 Drawing Sheets

(56) References Cited

U.S. PATENT DOCUMENTS

| | | | |
|---|---|---|---|
| 2016/0205431 A1* | 7/2016 | Avedissian | H04N 21/812 |
| | | | 725/37 |
| 2017/0140490 A1* | 5/2017 | Leonard | H04N 5/23258 |
| 2018/0204236 A1* | 7/2018 | Morgan | G06Q 30/0283 |
| 2019/0306588 A1 | 10/2019 | Taylor et al. | |
| 2019/0340605 A1* | 11/2019 | Lewis | G06F 16/632 |

OTHER PUBLICATIONS

Screen Captures from YouTube Video clip entitled "Spinfire Overview Tutorial", 1 page, uploaded on Jun. 18, 2017 by user "Spinfire App", retrieved from https://www.youtube.com/watch?v=Lv2lbKXjq80 (hereinafter "Spinfire2"). (Year: 2017).*

C. Screen Captures from YouTube Video clip entitled "Spinfire DJ—Accept a Spin Tutorial", 3 pages, uploaded on Jun. 21, 2017 by user "Spinfire App", retrieved from https://www.youtube.com/watch?v=64VN1ulXwNQ (Year: 2017).*

Premier Podcast Advertising Network (https://www.advertisecast.com/podcast-advertising). Retrieved Apr. 26, 2021.

Podcast Advertising Marketplace | Targeted Podcast Advertising | Podbean (https://sponsorship.podbean.com). Retrieved Apr. 26, 2021.

RedCircle | Brands & Agencies (https://www.redcircle.com/brands). Retrieved Apr. 26, 2021.

International Search Report and Written Opinion received for counterpart International Application No. PCT/US2021/028941 dated Jul. 21, 2021 (17 pages).

* cited by examiner

SYSTEM AND METHODS FOR FACILITATING CONTENT PROMOTION TRANSACTIONS BETWEEN CONTENT PROMOTERS AND ARTISTS

CROSS-REFERENCE TO RELATED APPLICATION(S)

This application claims the benefit of the Applicant's U.S. Provisional Application No. 63/014,630, entitled "Systems and Methods for Facilitating Setlist Slot Transactions Between DJs and Artists," filed Apr. 23, 2020, which is incorporated herein by reference in its entirety.

BACKGROUND

Although a DJ's set may last only a few hours, DJs often spend many more hours before a show following new and upcoming music, identifying what songs can be played next to each other based on common musical characteristics, figuring out transitions between songs, and filling empty slots in their setlist. Similarly, influencers who post via social media services or stream using online streaming platforms often seek songs/tracks to accompany their performances. While modern technology has made it easier to create and share music and other content with the world, the boom in content creation has made it harder for DJs and other content promoters to sift through all of the newest content while planning their performances. At the same time, shifts in technology and social media have altered the way artists seek to gain exposure. Artists may now share their music through numerous platforms hoping to boost their publicity and be heard and/or discovered by more people. Many artists even spend money on various social media platforms promoting their music and would be willing to spend money promoting their music to DJs or other promoters to make their way into a setlist at popular clubs and events or into social media or other streaming channels. Accordingly, there is a need for a system that connects content promoters and artists and facilitates integration of an artist's content into a content promoter's performance.

DETAILED DESCRIPTION

Figure 1:
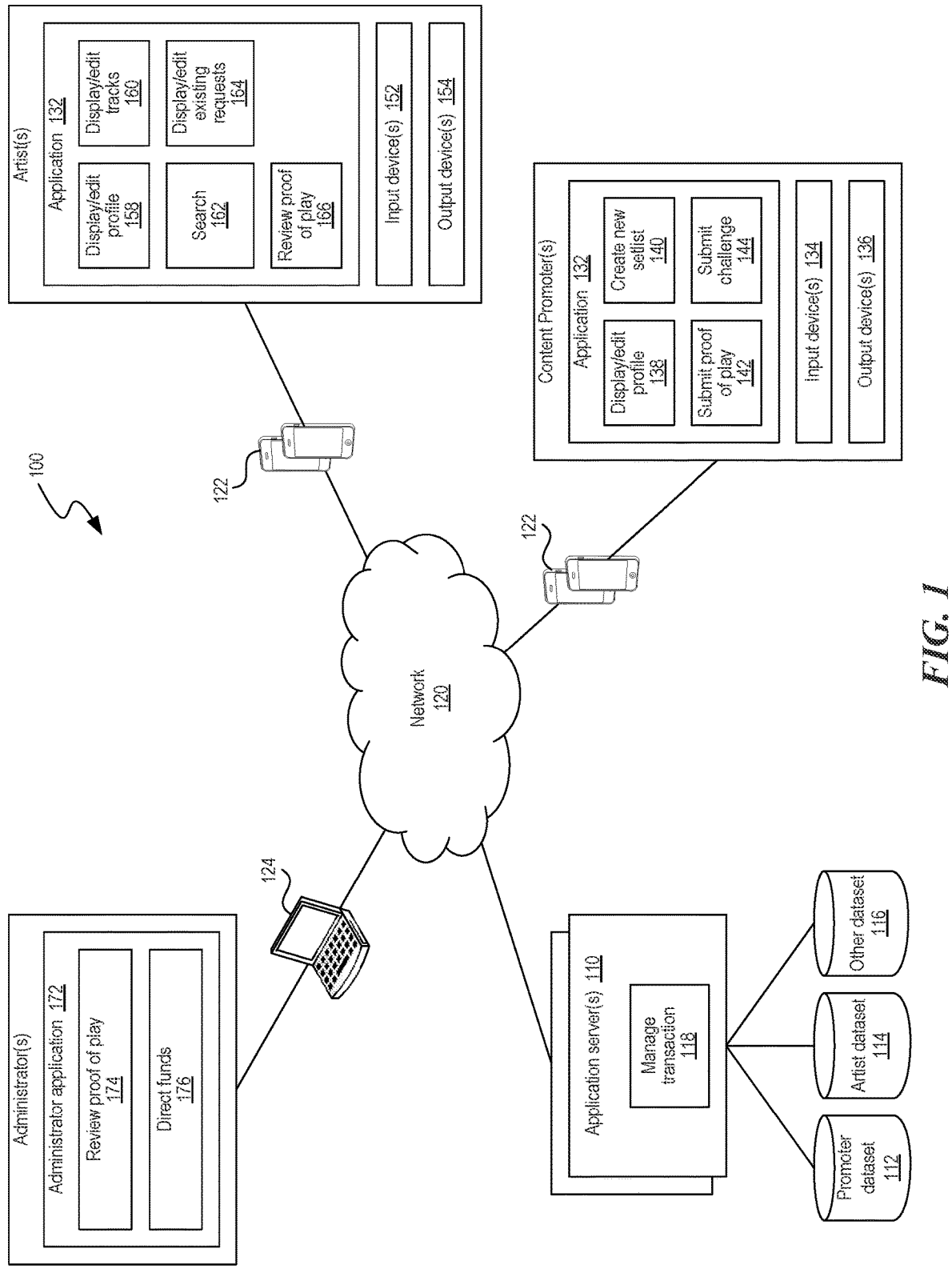
FIG. 1 is a block diagram of a representative environment in which aspects of the described system operate.

A system and methods for facilitating transactions relating to content promotion in a content promoter's performances are described. For example, the system facilitates transactions by creating a marketplace for content promoters (e.g., disc jockeys (DJs), social media influencers, streaming media influencers) to publish available slots in an upcoming performance and receive submissions from artists requesting their musical track or other digital content be played and/or displayed in an available slot. The artists' submissions include a price the artist is willing to pay and/or information about the characteristics of their musical track or other digital content. The system facilitates transactions between content promoters and artists by the use of an escrow payment and "proof of play" system. The escrow system charges an artist in advance for musical tracks that are submitted to be played or other digital content that is to be presented, but holds payment of those charges until after the content promoter has played the track or displayed the digital content and proof of that play has either been provided to, and accepted by, the artist, or the artist has confirmed that the play has occurred. Proof of play is provided to the artist in the form of, for example, an audiovisual recording that the content promoter records of the track being played at an event. Alternatively, the content promoter provides the artist with a URL or other link to the performance of content, and by accessing the link the artist confirms that the performance of content has occurred. The escrow and proof of play system helps protect content promoters and artists against potential default by either party to the transaction.

To allow content promoters to identify available performance slots, the system provides a user interface for a content promoter to advertise an upcoming event as well as available slots at that event. The content promoter can describe details about the event, details about the available slots (e.g. slot time, slot length, surrounding songs), desired and/or required characteristics for musical tracks or other digital content (e.g., videos, images) to fill the available slots, and a price for the available slots. In some embodiments, the price can be specified as a fixed rate for a slot (e.g. $100 per slot, $300 for a prime slot, $50 for an early slot, etc.) or a variable rate for a slot (e.g., $100 per 1000 people attending the event or per 10,000 expected impressions). In some embodiments, the price can be a suggestion or baseline, allowing artists to bid in responding to the advertised slot. Once the content promoter provides the system the details of the slot or slots that are available, the system allows the content promoter to publish the event/slots and make the advertised events/slots available for review by artists.

Once advertised, available events and slots are discoverable by artists. Using the system, artists are able to search for slots with content promoters and at events where they would like to have their track played or their digital content presented. The system provides a user interface that allows artists to search for events and/or slots based on event details, the specified characteristics associated with the slot, the price per slot, and/or other details. When a desired slot or slots is identified by the artist, the system allows the artist to create a request that one of their tracks be played or their digital content be presented in the identified slot(s).

As artists make submissions for a slot, the system collects the submissions and presents them to the content promoter that advertised the slots. The content promoter can review information about the artist, listen to submitted tracks or view submitted digital content, and choose submitted content to be played or presented in the advertised slot. Once the content promoter accepts a track for the slot, the system bills the artist for the accepted submission at the specified price. In some embodiments, the billing occurs automatically by charging an account (e.g., a credit card account, bank account, Google Pay account, Venmo Account, PayPal account, Apple Pay account, etc.) saved by the system. In some embodiments, the system can send a notification to the artist to communicate the acceptance and request a method of payment. For example, the artist can choose among accounts saved in the system, input new account information, input information on a bank account for an electronic check or to wire funds, etc. In some embodiments, the system can obtain payment from the artist in some combination of the above. For example, the system may send a notification and provide the artist with three days to insert/elect a payment method, then charge a default method (e.g., a credit card saved in the system) if the artist does not respond. To help ensure an artist receives the requested slot, the system deposits the payment into an escrow account until after the content promoter's performance. When the artist has been billed and the amount placed into escrow, the system closes the available slot listing so that other artists cannot submit requests for that slot.

When the date and time of the event approaches, the system facilitates the content promoter playing the track or presenting the digital content, such as by transferring a copy of the content to the content promoter and sending push reminders to the content promoter as the slot time approaches. To prove to the artist that the track was played or the digital content presented during the promised slot, the system facilitates the collection of evidence that the content promoter played the artist's track or presented the digital content at the designated time. To do so, the system can send reminders to the content promoter to capture a proof of play, provide a user interface for creating the proof of play, and/or various other functions. In the case of live events that the artist may not be able to attend, the proof of play can be a video of the track being played or the digital content presented at the event, as well as metadata associated with the video (e.g., location of video, time of video). The content promoter is provided an application on a mobile device (e.g., a smartphone), for example, with a user interface for creating the proof of play. The user interface includes a recording screen that allows the content promoter to capture a video and audio recording at the event, using the microphone and camera of the mobile device. In some embodiments, the application can concurrently capture various information to accompany the audiovisual recording, such as the mobile device's geolocation, the time, and/or various other relevant information.

In some embodiments, the proof of play is captured by the system. System-confirmed proof of play is particularly useful for network-accessible events, such as live streamed events or online posts, that are accessible to the system. For example, at the date and time of the agreed-to performance, the system may access a URL, address, or other link to social media, streaming, blog, or other channel via which the content will be presented by the promoter. The system can capture, via video, all or a portion of the performance of the artist's content. The captured video is time-stamped to reflect the time of capture, and the URL or other address from which the video was captured is also stored in conjunction with the video. The system then transmits a message to the artist that contains a link to allow the artist to view the captured video and associated capture information. After reviewing the captured video, the system asks the artist to confirm that they observed the content being presented in the agreed-to fashion.

In some embodiments, the proof of play is directly confirmed by the artist. Artist-confirmed proof of play is particularly useful for network-accessible events, such as live streamed events or online posts. For example, if the content is being presented via a streaming channel that is readily accessible to the artist, the artist can directly verify that the submitted content was actually presented as promised. In those embodiments, promoters may be required to provide the system with a URL, address, or other link to the social media, streaming, blog, or other channel via which the content will be presented. As the date and time of performance approaches, the system transmits a message to the artist that contains a URL along with a reminder of the date and time at which the content will be presented. After the date has passed, the system transmits a second message to the artist asking the artist to confirm that they observed the content being presented in the agreed-to fashion.

Once the proof of play is created by the content promoter or by the system it is delivered to the artist through the application. The artist can then be prompted by the system to review the proof of play, and indicate an approval, message the content promoter about the proof, and/or challenge (e.g., decline, flag, reject) the proof of play. If the proof is approved, the payment is fully processed, and the funds are released from escrow to the content promoter. If the proof is challenged, the proof of play can be delivered to a system administrator for further review. In some embodiments, if the artist challenges the proof of play, the artist is allowed to provide an explanation as to why they found the proof to be insufficient and the content promoter is allowed to provide a rebuttal of the artist's explanation. In one embodiment, the system can provide the artist with a limited time to review the proof of play before the system defaults to an approval to pay the content promoter. For example, the artist can be given 48 hours to review the proof of play before the system defaults to an approval. In some embodiments, the system can automatically verify the proof of play. For example, the system can compare the proof of play to the content submitted by the artist and verify that the proof of play contains the content being presented in the agreed-to fashion. The artist can then be given a limited time to review and challenge the system-confirmed proof of play before the system pays the content promoter.

In some embodiments, the administrator receives notification about proof of play for review through an administrator application. For example, the administrator application may enable the administrator to interact with the system through a user interface on a personal computer, mobile electronic device, etc. When a proof of play is challenged by an artist, the proof is delivered to the administrator, who can view the original submission, the content promoter's proof of play, the artist's explanation of why the proof is being challenged, any rebuttal provided by the content promoter, any metadata associated with the proof, and/or various other information. Using the interface, the administrator can message the content promoter about the proof to solicit input (such as additional proof and/or testimony), message the artist to solicit further input, and ultimately decide whether the proof of play is sufficient evidence of performance to warrant the transfer of funds to the content promoter. If the proof is sufficient, the administrator can direct the release of escrowed funds to the content promoter, otherwise the administrator refunds the escrowed funds back to the artist. In addition to providing the administrator with an interface to resolve proof of play disputes, the administrator application can provide administrators with an interface to manage escrow accounts.

Content promoters can be DJs, influencers, streamers, internet celebrities, podcasters, or any other person or character who gives performances at events that can incorporate an artist's digital content. Promoters may give performances, for example, online through various streaming or social media platforms (e.g., YouTube, Twitter, TikTok, Twitch, Facebook, Instagram, etc.). Furthermore, in addition to music tracks, content created by an artist and promoted via the system can be any digital media capable of being included in a performance by a content promoter, such as music, spoken word, animation, video, or graphic art. Accordingly, a slot offered by a content promoter via the system can comprise inclusion of an artist's digital content in any event, such as including the content in a video, podcast, photo, social media post, or other performance. For purposes of illustration, the system is described herein using examples relating to DJs and musical artists, in which DJs advertise available slots for performance of musical tracks in a setlist. However, the system is not limited by these example implementations. These and other embodiments will become apparent to a person skilled in the art based on the descriptions provided herein.

As will be described in additional detail herein, the system employs various computer systems and applications to facilitate transactions between content promoters and artists. Aspects of the system may be implemented using cloud services to generate user interfaces, store tracks, and manage communications and payment. Aspects of the system may also be implemented in one or more stand-alone applications on mobile devices or personal computers. The stand-alone applications may interface with remote servers via wired or wireless communication networks.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Overview

FIG. 1 is a block diagram of a representative environment in which aspects of the described system 100 operates. The system 100 includes one or more application server(s) 110. In some embodiments, the application server(s) 110 are associated with a web site through which the system 100 may be accessed by content promoters, artists, administrators, and other users.

The application server(s) 110 are coupled to a promoter dataset 112, an artist dataset 114, and one or more other datasets 116. The promoter dataset 112 stores information related to promoter profiles, events, setlists or other performances, available slots in setlists or performances, videos of setlists/performances/slots, promoter statistics and/or other multimedia and metadata associated with promoters in the system 100. As described herein, a promoter can be, for example, a DJ or other influencer. The artist dataset 114 stores audio recordings of artist tracks, other content associated with an artist (e.g., video, images, audio, or other media), information relating to artist profiles, requests for play, artist statistics, and/or other multimedia and metadata related to artists within the system 100. The one or more additional datasets 116 can store metadata, usage statistics, administrator profiles, and/or other information associated with the system. Note that although the promoter dataset 112, artist dataset 114, and other datasets 116 are depicted in FIG. 1 as separate datasets, a single dataset and/or other combinations of datasets may store the information necessary for the system in various embodiments. The datasets may be maintained in a relational or non-relational database, data tables, flat files, or other data storage structures. The information stored in the datasets, as well as the system's use of the information, is illustrated by the discussion of the system 100 below. Further, as illustrated, the application servers 110 can include a manage transaction module 118 that operates to facilitate transactions between promoters and artists in the system.

The application server(s) 110 are accessed by mobile devices 122, laptop or desktop computers 124, or other computing devices (not shown) via a network 120, such as the Internet, a wide area network (WAN), a local area network (LAN), or any other combination of public or private, wired or wireless, networks. The term computer or computing device, as used herein, may include general purpose computer systems, televisions, set-top boxes, microprocessor-based or programmable consumer electronics, Internet appliances, multi-processor systems, network PCs, mini-computers, and the like. The term computer or computing device may also refer to a special purpose computer or data processor that is specifically programmed, configured, or constructed to perform one or more computer executable instructions. The technology described herein may therefore be operated on a mobile device, such as a smartphone, a portable email device, a portable gaming device, or a tablet or touch screen display device.

In the illustrated embodiment, a promoter may access the functionality of the system via an application 132 operating on a computing device. The application 132 operates on a computing device having input devices 134 (e.g., keyboard, touchscreen, camera) and output devices 136 (e.g., touchscreen, speaker)—which can be housed in a single device, such as a smartphone 122, tablet, laptop, or other mobile device. The application 132 allows promoters to submit information about new events, performances, and/or sets that have available slots to fill. Once a promoter has accepted content from an artist to present during available performance slots, in some embodiments the application 132 allows the promoter to record and submit to the application servers 110 a proof of play (such as an audiovisual recording) of the promoter playing the accepted content. As will be described in additional detail herein, the application 132 also allows a promoter to review submissions for available slots, review a proof of play before submission, and/or review challenges to submitted proofs of play. To enable this functionality, the application 132 includes a number of modules that allow a promoter to interact with the system. For example, the application includes a display/edit profile module 138 that allows the promoter to create and/or edit their system profile and a create new performance module 140 to allow the promoter to describe the details of an event at which a performance will be given, the available slots in the performance that will be played at the event, and details about the content characteristics the promoter seeks to fill the available slots, etc. The application 132 also includes a submit proof of play module 142 to allow promoters to create proof (e.g., an audiovisual recording with associated metadata) that the promoter played a submitted content at the specified place and time in the promoter's performance and submit the proof of play to the system for review. The application also includes a submit challenge module 144 that allows the promoter to review and respond to any challenges that were made by an artist to the sufficiency of a submitted proof of play. The application 132 communicates with the application server(s) 110 via, for example, an API.

An artist seeking to submit content to a promoter may access the functionality of the system via the application 132 operating on a computing device. The application 132 operates on a computing device having input devices 154 (e.g., keyboard, touchscreen) and output devices 156 (e.g., touchscreen, speaker)—which can be housed in a single device, such as a smartphone 122. For example, in the illustrated embodiment the application 132 executes on an artist's smartphone, using modules within the smartphone for input and output devices. The application 132 can be used to record or upload content to the system 100 (for storage in the artist dataset 114), submit content responsive to available slots through the system 100, submit payment for any content accepted by promoters, communicate with the promoter, submit challenges to proofs of play, and/or any other inputs required from artists. The application 132 can also be used to receive and review proof of play (e.g., to play audiovisual recordings of performances submitted by DJs or other promoters, or to watch or review performances to confirm that the digital content was appropriately displayed or played), receive and display messages, and/or respond to any other communications sent to artists. To perform these functions, the application 132 includes several modules tailored for the artist to use. For example, the application 132 includes a display/edit profile module 158 that allows an artist to create and/or edit a profile maintained by the system; a content management module 160, which allows artists to upload, characterize, and maintain one or more tracks or other content created by the artist; a search module 162 that allows the artist to search for events/performances/slots; a submissions module 164 that allows the artist to submit tracks or other content responsive to a promoter's advertised slot(s), including managing or deleting those submissions under certain circumstances; and a review proof of play module 166 that allows the artist to review video, audio, and/or metadata evidence that the content was actually played by the promoter at the agreed to event, performance, or slot.

Finally, a system administrator seeking to manage the system 100 may access the system via an administrator application 172 operating on a computing device. The administrator application 172 allows a system administrator to review user interactions and help police transactions. For example, the administrator application includes a review proof of play module 174 through which administrators can review a proof of play that was declined by an artist to determine whether the challenge is legitimate. The proof of play module allows the administrator to investigate a submitted proof of play in certain instances (e.g., when the proof of play appears inadequate and/or faulty), as well as to request further information from either the artist or the promoter to arbitrate any disputed play. The administrator application 172 can also include a funds management module 176 that automatically releases funds to promoters after their performance of a track and receipt of confirmation from the artist that the proof of play is acceptable. The funds management module also allows an administrator to return funds to an artist if the administrator agrees that a proof of play fails to demonstrate that the promoter presented the submitted content in accordance with the agreed to performance slot. As will be described in additional detail herein, the system collects funds from the artist when an artist's submission has been accepted by a promoter and holds those funds in escrow until the artist has accepted the proof of play, the system has detected an appropriate proof of play, or until an administrator has ruled that the proof of play is sufficient. The use of escrow ensures payment will be made when a promoter presents the submitted content in agreed-to performance slot.

While the application 132 and administrator application 172 are depicted as two applications in FIG. 1, it will be appreciated that the applications may be the same application with different interfaces that are presented to a user depending on the role of the user using the system. Additionally, while different modules are described as being responsible for certain functionality, module functionality may be combined into fewer modules or divided into additional modules depending on the system architecture.

Figure 2:
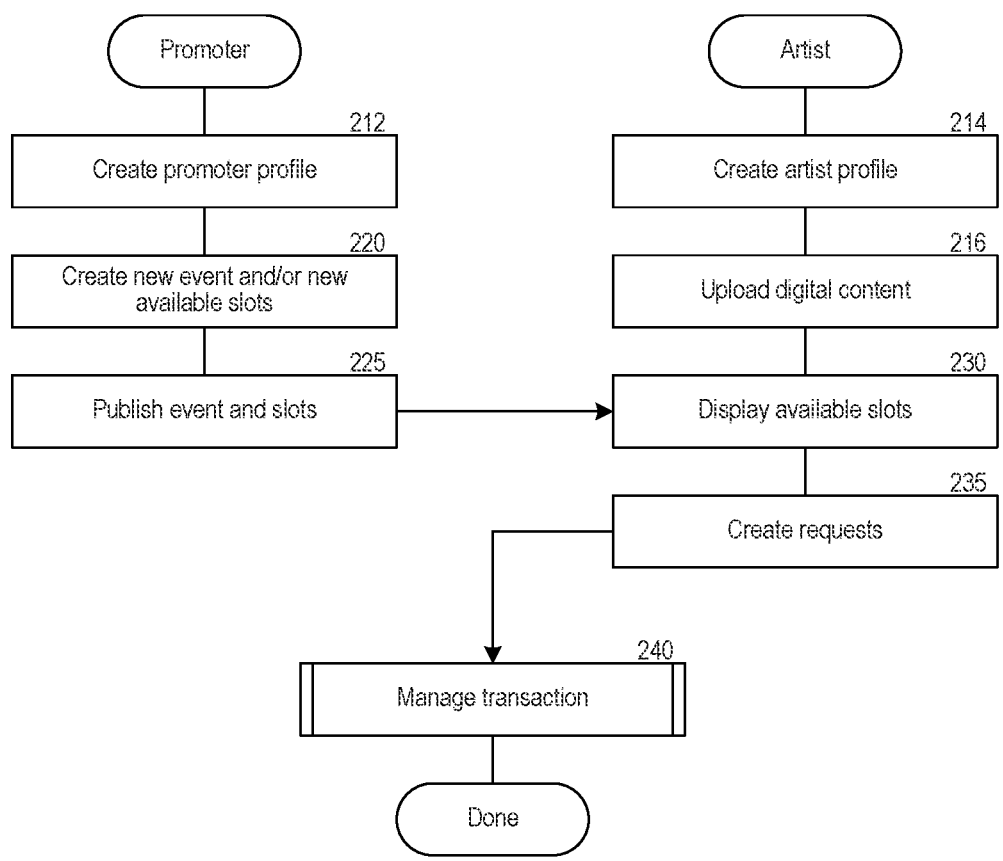
FIG. 2 is a flow diagram illustrating an overview of a transaction in one embodiment of the system.

FIG. 2 is a flow diagram illustrating an overview of a transaction process 200 in some embodiments of the system. The first time a promoter accesses the system, at block 212 the application 132 prompts the promoter to create a promoter profile. Similarly, the first time an artist accesses the system, at block 214 the application 132 prompts the artist to create an artist profile. An example user interface for the creation of an artist or promoter profile is illustrated in FIG. 3.

Figure 3:
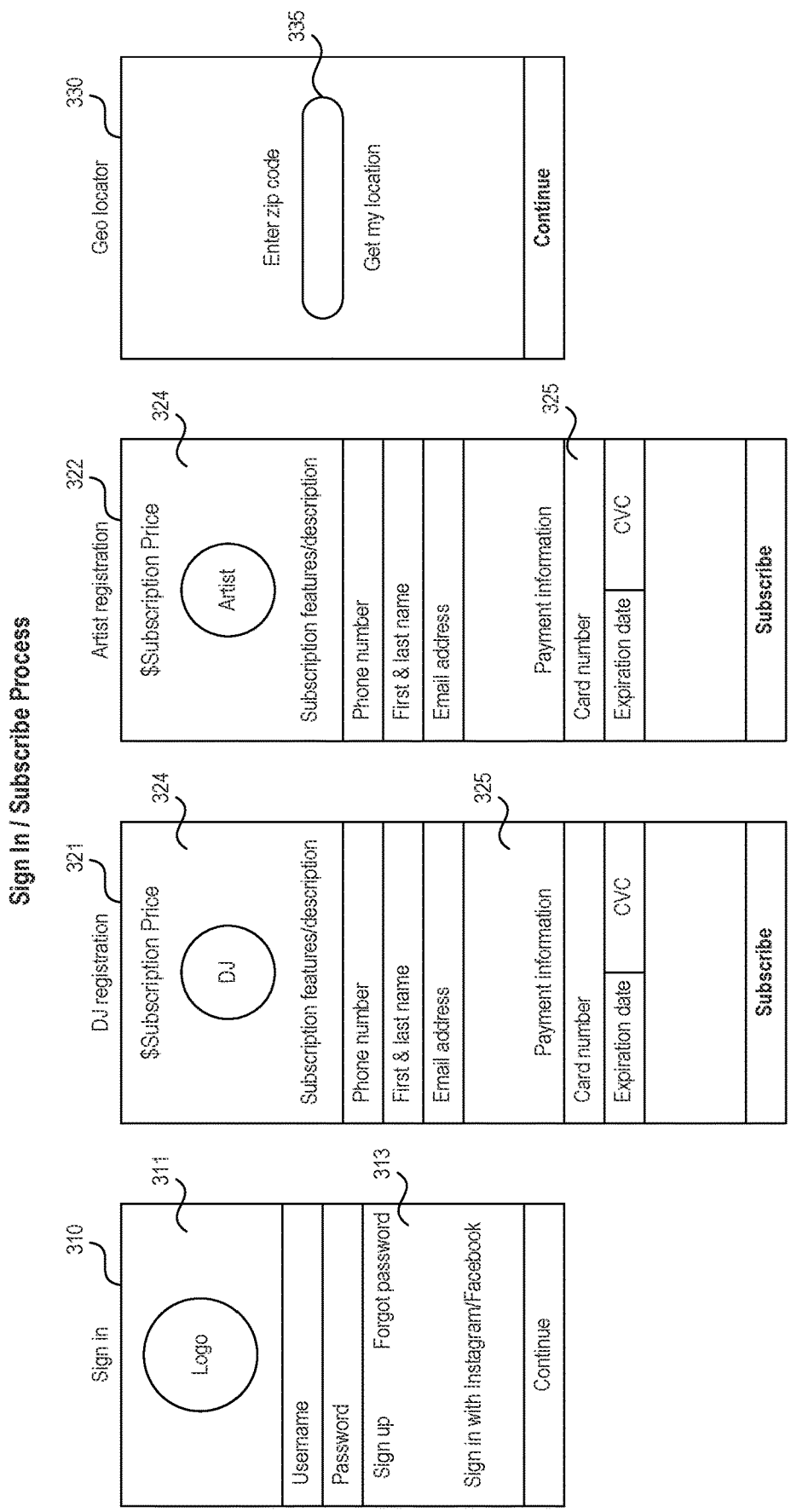
FIG. 3 is a display diagram of an example user interface for creating a profile in the system.

FIG. 3 is a display diagram of an example user interface for the creation of a user profile. In the depicted example implementation of FIG. 3, the system is configured such that the promoter is a DJ and the artist is a musical artist. A sign-up page 310 includes a display area 311 and an input area 313. The display area 311 can display a branded system logo, instructions for signing up, information about the system, and/or other graphics or information. The input area 313 requests basic information about the new user, such as a username and password for the user account. In some embodiments, the input area 313 can include a feature allowing a user to skip various steps in the sign-up page 310 and registration page 320 by instead linking the user account with their Instagram, Facebook, Google, and/or other pre-existing account or identity verification service.

After creating a username and password, the new user is allowed to register as either a DJ using a DJ registration interface 321 or register as an artist using an artist registration interface 322. Both the DJ registration interface and the artist registration interface include a display area 324 and an input area 325. In the display area 324, the DJ or artist is allowed to submit a picture, select an icon or other identifier, and otherwise provide a description of themselves to distinguish from other DJs or artists. In the input area 325, a DJ or artist submits contact information and financial information that is sufficient to allow payment to be made or received. For example, the input area may include text entry fields that allows the DJ or artist to enter contact information (e.g., name, phone number) and payment information. The payment information includes sufficient information to allow payments to be made to a counterparty (e.g., a credit card, a debit card, account information to allow direct transfers from a checking or savings account) or to allow payment to be received from a counterparty (e.g., via direct transfers to a checking or savings account or other payment account information to receive payments). The input area 325 may also allow a DJ to submit information about the DJ's past performances, social media links, and/or other information related to the DJ. For an artist, the input area 325 may allow an artist to submit information related to the artist's history, social media links, and/or other information related to the artist. In some embodiments, after certain registration information has been received by the system, the system can display a geolocation interface 330, allowing the user to input geographic location information such as by entering a zip code in field 335. In some embodiments, the geolocation interface 330 may request to use GPS information from a personal electronic device, such as a smartphone. In some embodiments, the geolocation interface 330 can request the user enter an address to set a location associated with the user.

After registration is complete, the system can guide users through a variety of orientation screens in the application. For example, the system can orient users on navigation or menu functions in the application. Further, the application can include a series of onboarding videos (not shown) that describe various capabilities and functions of the application.

Returning to FIG. 2, at block 216, the system can prompt artists to upload content, which is maintained in the artist dataset. At block 220 the system allows the promoter to create a new event and/or new performance slots. After receiving an initial input to create a new event/performance slots, the system can prompt the promoter for a variety of inputs characterizing the event, the performance and available slots, the content characteristics the promoter prefers for content submissions for the slots, etc. Example processes the system can follow to create events and characterize performances are set out in U.S. patent application Ser. No. 17/124,192, filed Dec. 16, 2020, and entitled "Connecting Content Promoters and Artists for Content Promotion Transactions," which is incorporated herein by this reference in its entirety. At block 225, the system outputs/publishes the availability of a new slot or slots to the community of artists that use the system. That is, the system makes the new slot or slots available for searching, such that artists looking to submit content to the promoter are able to locate a slot and submit content responsive to the characterized slot. The system also stores details about the available slot or slots in, for example, the promoter dataset 112.

After the system publishes available slots at block 225, artists are allowed to review those slots and identify content that might be responsive to those slots. At block 230, the system allows an artist to search and review available slots. For example, the system can allow an artist to search for and review available slots based on details about the event, details about the performance, details about a promoter, and/or details about the content characteristics sought for specific slots. These search filters allow an artist to specifically target events, promoters, and/or slots to control where their content is played. Processes of searching and creating submissions are also set out in the previously-referenced U.S. patent application Ser. No. 17/124,192 entitled "Connecting Content Promoters and Artists for Content Promotion Transactions." At block 235, once an artist identifies a desired slot or slots and content to submit for those slots, the system creates a slot submission based on inputs from the artist and sends the submission to the application servers. At function block 240, the system manages a transaction between the promoter and artist based on the submission.

Figure 4:
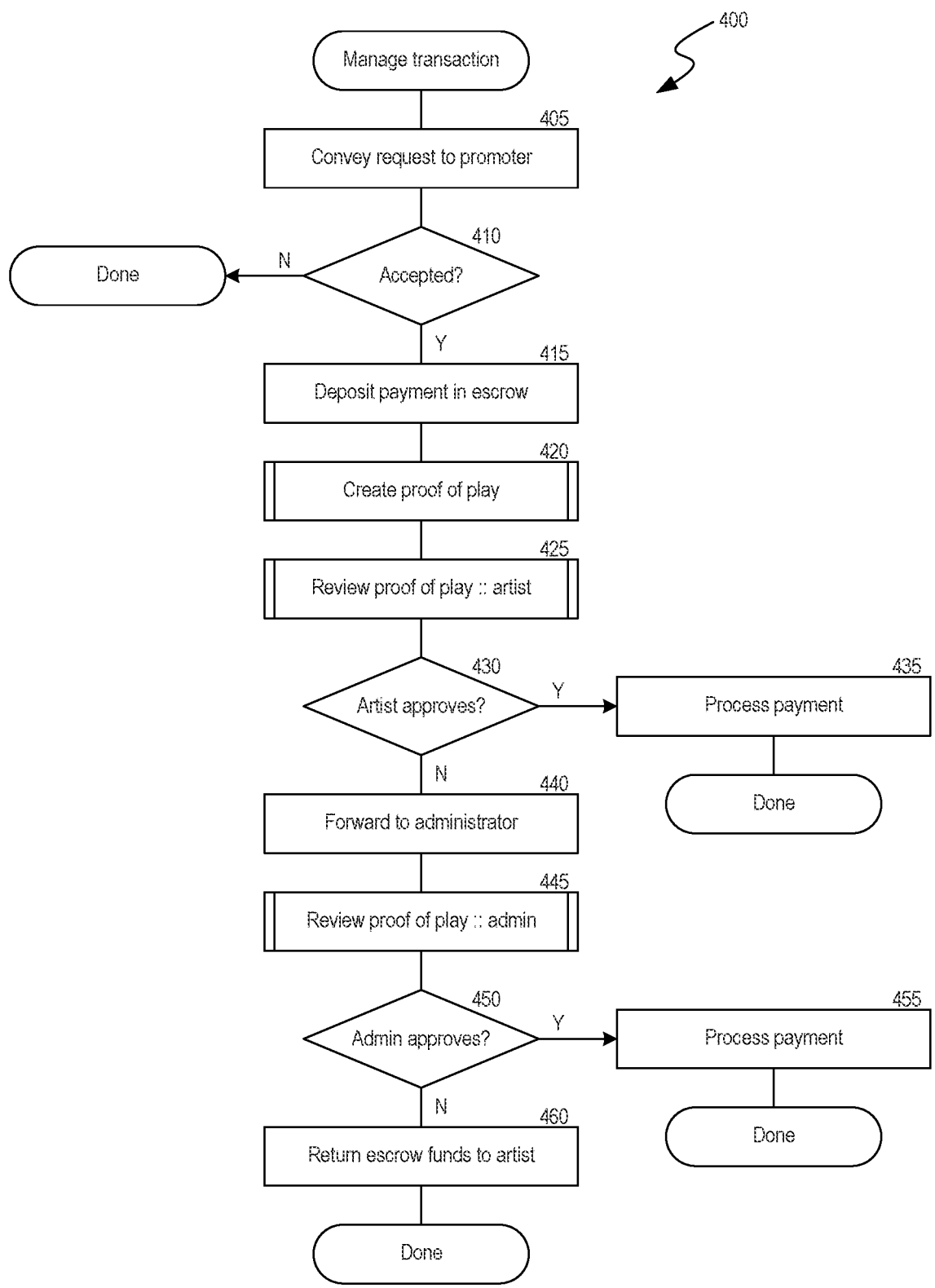
FIG. 4 is a flow diagram of a process that application servers can execute to manage a transaction in the system.

FIG. 4 is a flow diagram of a process 400 that is executed by the system to manage a transaction between promoters and artists in accordance with some embodiments of the system. The manage transaction process 400 is executed by the application servers after an artist's submission is received by the system. At block 405 the system sends the artist's submission to the promoter that created the slot that received the submission. For example, details about the submission can be displayed through a user interface in the application 132. An example user interface in the application 132 is illustrated in FIG. 5.

Figure 5:
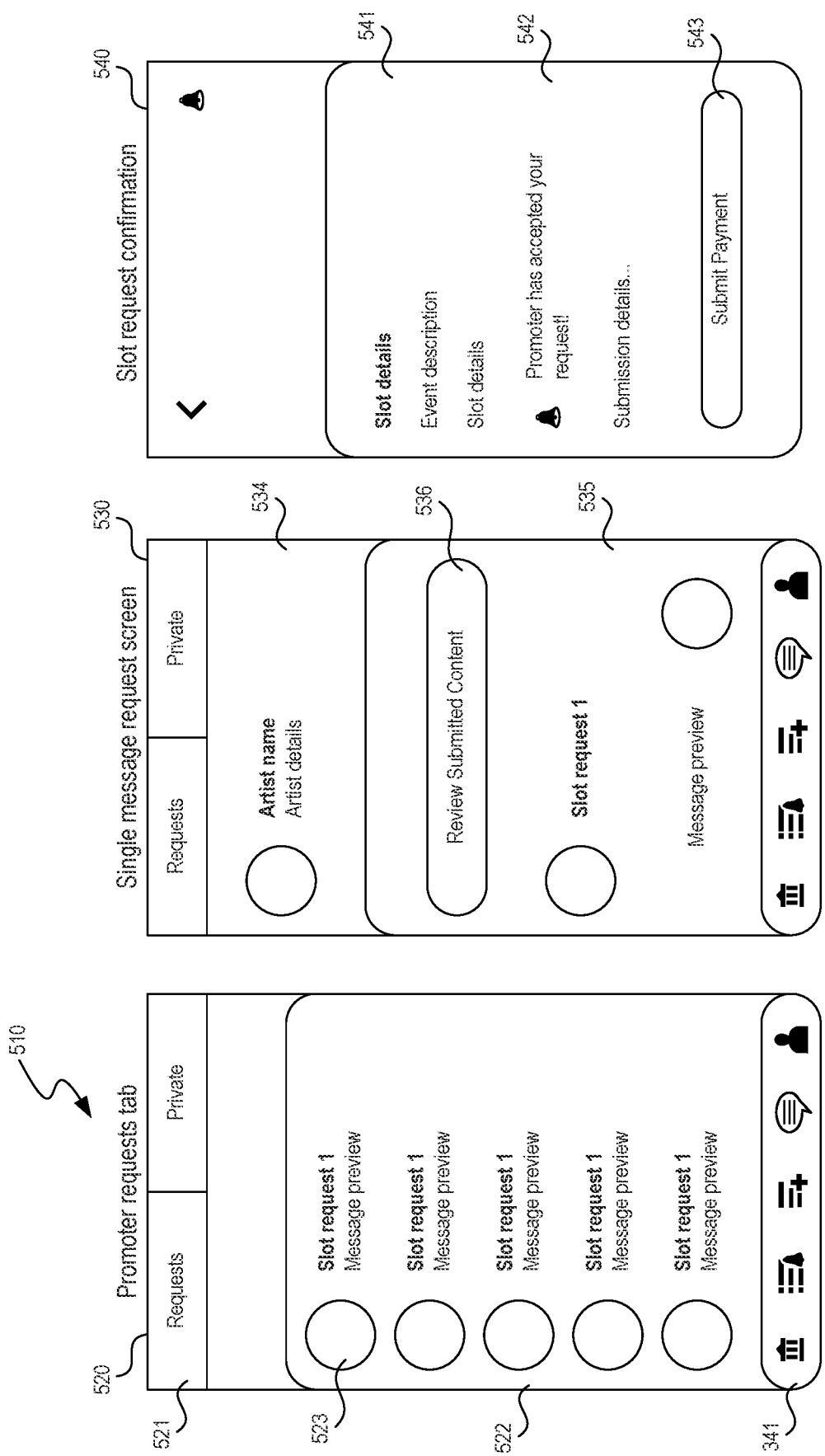
FIG. 5 is a display diagram of example user interfaces for reviewing submissions and for paying for accepted submissions.

FIG. 5 is a display diagram of an example user interface 510 that allows a promoter to enter the performance parameters in accordance with process 400. As illustrated in FIG. 5, pending requests for a promoter to review are displayed to the promoter on a display submissions page 520. The display submissions page 520 includes navigation tabs 521, and a display area 522 having one or more submission buttons 523. The navigation tabs 521 can be used by the promoter to toggle between the display submissions page 520 and other quick-linked pages. The display area 522 displays a list of pending submissions. In some embodiments, the display area 522 can include filters (not shown) that allow a promoter to filter which submissions are being displayed. For example, a filter may allow the promoter to view only those submissions received within the past 24 hours, view all submissions for a specific slot, view all submissions for an event, etc. In some embodiments, submission buttons 523 display a preview of a submission and, when selected, cause the application to navigate to a dedicated page for that submission.

When a promoter selects a submission (e.g., the first-displayed "Slot Request 1" in the illustrated embodiment) by selection of the corresponding submission button 523, they are brought to a single submission display page 530. As illustrated, the single submission display page 530 includes a first display region 534 that presents information about the submitting artist and a second display region 535 that includes details about the submission. For example, in some embodiments, the second display region 535 includes information about the slot, a preview of a personalized message from the artist (or the entire message), decision buttons to either accept or reject the submission (not shown) and a review submitted content button 536. The review submitted content button 536 allows the promoter to review the content accompanying the submission. If the promoter wishes to preview more content, they can navigate back to the display submissions page 520, for example through navigation tabs 521. If they are ready to accept or reject the submission, they can input their decision using the decision buttons. The application 132 receives the promoter's decision and communicates the decision to the application servers.

The outcome of the promoter's decision (i.e., whether the track is accepted or rejected) is communicated to the artist via a slot request confirmation page 540. The confirmation page 540 includes a display region 541, which displays information about the status of a submission via a status line 542 as well as various other details about the event and/or specific slots at the event. As illustrated, display region 541 also includes a payment button 543, which links the artist to an interface (not shown) allowing them to select among payment methods that will be used if their submission was accepted by the promoter. In the illustrated embodiment, the interface displays a confirmation that the promoter has accepted the submission in status line 542, prompting the artist to submit payment for the slot.

Returning to FIG. 4, the process 400 continues at decision block 410, where the system receives the promoter's decision about a submission. At decision block 410, if the promoter accepts an artist's submission, the process 400 continues at block 415, otherwise the process 400 completes.

At block 415 the system applies the payment instrument selected by the artist and deposits the corresponding funds in escrow. In some embodiments, the system automatically charges an artist's payment account for the slot price when a promoter approves the submission. In some embodiments, at block 415 the system sends a notification to the application 132 notifying the artist of the accepted submission and requesting payment (e.g., through submission page 540 of FIG. 5). Artists can then choose between various payment methods (e.g., can choose between saved credit cards and/or bank accounts and/or other forms of payment). In some embodiments, at block 415, the system executes some combination of the billing processes disclosed above. For example, the system may notify the artist of the approved submission and proceed to charge a default payment method if the artist does not respond within 24 hours.

After depositing the payment in escrow, processing continues at function block 420 in which the system facilitates the promoter's creation of a proof of play. The proof of play is intended to serve as evidence that the promoter played or displayed the artist's content during the agreed-to slot.

Figure 6:
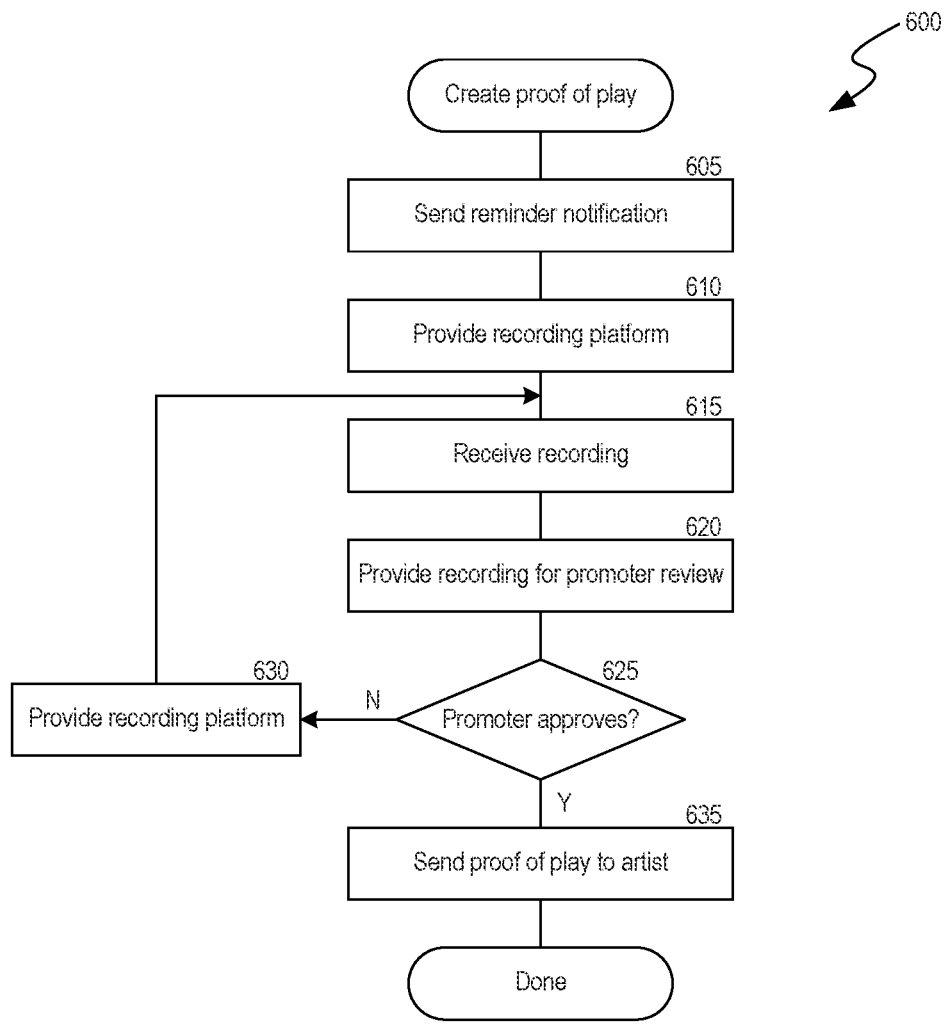
FIG. 6 is a flow diagram of a process for creating a proof of play by a content promoter.

FIG. 6 is a flow diagram of a process 600 that is executed by the system to facilitate the creation of a proof of play by a promoter. Promoter-generated proof of play is particularly useful for live in-person events, since an artist might not be present at the event and proof that the artist's content was performed at the event would therefore be difficult to confirm. The create proof of play process 600 can be executed by the application servers 110 in conjunction with the application 132 to generate the proof of play. At block 605 the system sends a reminder to the promoter of the upcoming obligation to play submitted content in a particular performance slot. In some embodiments, the reminder can be a push notification on the promoter's smartphone indicating the submitted content is expected to be played soon. In some embodiments, for example, the system can send a push notification that a track is scheduled to be played in 15 minutes. In some embodiments, the time remaining before a track is scheduled to be played (e.g., in a DJ's setlist) may be a different amount of time or can be measured by a number of songs until the scheduled slot (e.g., a reminder can be sent 3 slots before the scheduled slot). In some embodiments, the system can send a second reminder at the precise time the track is scheduled to be played and provide the promoter with a button, link, or control that allows the promoter to easily start the process of creating the proof they played the track.

At block 610, the system provides a recording interface to the promoter. In some embodiments, the recording interface that the system provides at block 610 is a video recording interface in the application 132 that accesses a smartphone's input devices (e.g., camera and microphone) to create a video record (with associated audio recording) of the content being played. In some embodiments, the recording interface can also gather other information associated with the audiovisual record, such as the time, date, and geolocation of the promoter's smartphone (e.g., the geolocation can be used to demonstrate that the smartphone is at the event), outputs of the smartphone (e.g., determining if the device is being used to play the track), and various other measurements of metadata associated with the promoter and application 132.

At block 615 the system receives the proof of play recording and/or various metadata associated with the recording (e.g., the location of the promoter's smartphone while generating an audiovisual recording). In some embodiments, the system saves the recording in the promoter dataset.

At block 620, the system makes the proof of play recording available for promoter review, and requests the promoter to make a decision regarding whether the recording is acceptable to submit to the artist. In some embodiments where the proof of play is a video recording, for example, the application 132 can replay the video and display any associated metadata to the promoter at block 620. This record-and-review process can help ensure that the promoter has reviewed the proof of play they submit through the system and have personally judged the sufficiency of the proof. By allowing a promoter to approve of the proof before they submit it, the system can reduce the number of challenges that are subsequently raised and reduce the need for manual review of challenges.

At decision block 625 the system receives an indication from the promoter regarding whether the promoter approves of the proof they generated. If the promoter approves, processing continues at block 635, otherwise at block 630 the system provides the recording interface to the promoter to allow the promoter to capture a different proof of play (if time and/or circumstances allow for re-capture). At block 635, the system sends the proof of play to the artist associated with the submission and completes. A representative user interface to allow the promoter to record and submit a proof of play is illustrated in FIG. 7.

The example process 600 illustrates a manner in which the system allows a promoter to create the proof of play, such as when a promoter plays artist content at a live (in-person) event. In some embodiments, the proof of play is directly confirmed by the artist. Artist-confirmed proof of play is particularly useful for network-accessible events, such as live streamed events or online posts. For example, if the content is being presented via a streaming channel that is readily accessible to the artist, the artist can directly confirm that the submitted content was actually presented as promised. In those embodiments, promoters may be required to provide the system with a URL, address, or other link to the social media, streaming, blog, or other channel via which the content will be presented. As the date and time of performance approaches, the system transmits a message to the artist that contains a URL along with a reminder of the date and time at which the content will be presented. After the date has passed, the system transmits a second message to the artist asking the artist to confirm that they observed the content being presented in the agreed-to fashion. If the artist views the content being presented in the agreed-to fashion, the artist may respond to the system with a message confirming that the content was appropriately presented. If, however, the artist does not see the content being presented, the artist may reply to the system with a message that the promoter had failed to perform as promised.

In some embodiments, the proof of play is captured by the system. System-confirmed proof of play is particularly useful for network-accessible events, such as live streamed events or online posts, that are accessible to the system. For example, at the date and time of the agreed-to performance, the system may access a URL, address, or other link to social media, streaming, blog, or other channel via which the content will be presented by the promoter. The system can capture, via video, all or a portion of the performance of the artist's content. The captured video is time-stamped to reflect the time of capture, and the URL or other address from which the video was captured is also stored in conjunction with the video. The system then transmits a message to the artist that contains a link to allow the artist to view the captured video and associated capture information. After reviewing the captured video, the system asks the artist to confirm that they observed the content being presented in the agreed-to fashion. If the artist agrees that the content was presented in the agreed-to fashion, the artist responds to the system confirming that the content was appropriately presented. If, however, the artist does not see the content being presented in the agreed-to fashion, the artist responds to the system that the promoter had failed to perform as promised. When an artist denies the proof submitted, the proof can be provided to an administrator for review and arbitration through the administrator application.

Figure 7:
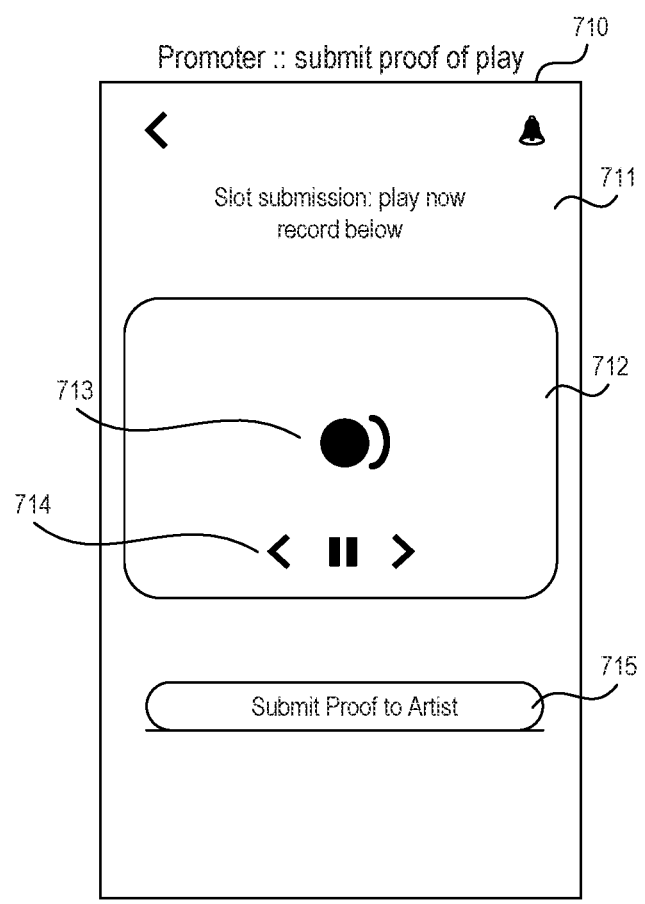
FIG. 7 is a display diagram of an example user interface for the content promoter to submit a proof of play.

FIG. 7 is a display diagram of an example user interface in the application 132 for the promoter to record and submit a proof of play. As illustrated, a submit proof of play page 710 includes a textual display region 711 where notifications to the promoter can appear as textual messages. The submit proof of play page 710 also includes an interface 712 with record button 713 and playback buttons 714. By pressing the record button 713, the promoter initiates the recording, for example, of a proof of play video using the smartphone's camera. When the record button is depressed, the display 711 displays the field of view being captured by the video. A stop recording button (not shown) is also displayed to allow the promoter to end the capture of video. After the video has been captured, the promoter can review the video using playback buttons 714. If the promoter is satisfied with the content of the proof of play video that they generated, they can submit the proof to the artist by selection of button 715.

Returning to FIG. 4, after the proof of play is sent to the artist, processing continues at function block 425. At function block 425, the artist reviews the proof of play and determines whether it sufficiently demonstrates that content was presented by the promoter at the agreed-to event and slot. A representative user interface to allow the artist to review the proof of play is illustrated in FIG. 8.

Figure 8:
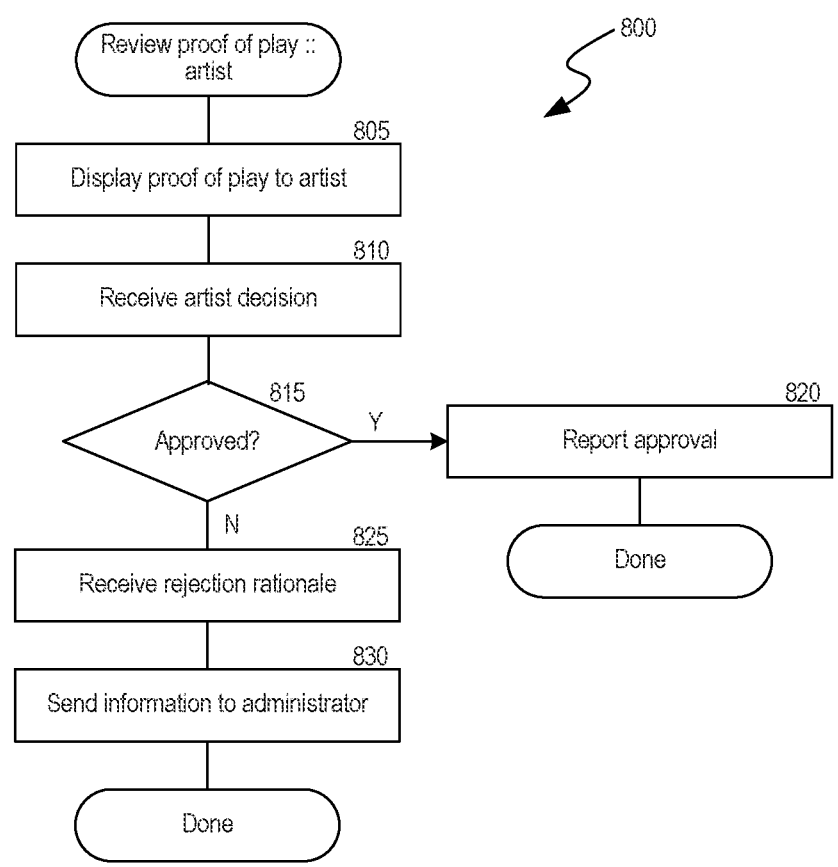
FIG. 8 is a flow diagram of a process for reviewing a proof of play by an artist.

FIG. 8 is a flow diagram of a process 800 that is executed by the system to allow an artist to review proof of play information. The review proof of play process 800 is executed by the application servers 110 in conjunction with the application to facilitate an artist's review. At block 805 the system displays the proof of play information to the artist. The system can allow the artist to review any audiovisual recordings, metadata associated with the recordings, and/or any other information submitted with the proof of play. After the artist reviews the proof of play information, at block 810 the system receives the artist's decision regarding the proof of play. At decision block 815, if the proof is approved, processing continues at block 820, otherwise processing continues at block 825. At block 820 the system reports the approval to the promoter (e.g., through a notification in application 132) then completes. At block 825 the system receives a rejection rationale from the artist explaining why they did not approve the proof. For example, the rationale can include a written explanation of the reasons why the artist is declining the proof of play, responses to multiple choice prompts as to why the artist is rejecting the proof of play, and/or other means of inputting information. For example, the artist may reject a proof of play and indicate that the track that they submitted was not the one being played in the audiovisual recording submitted as the proof of play. At block 830, the system sends information to the administrator for review, including the proof of play reviewed by the artist and the artist's rejection rationale.

Figure 9:
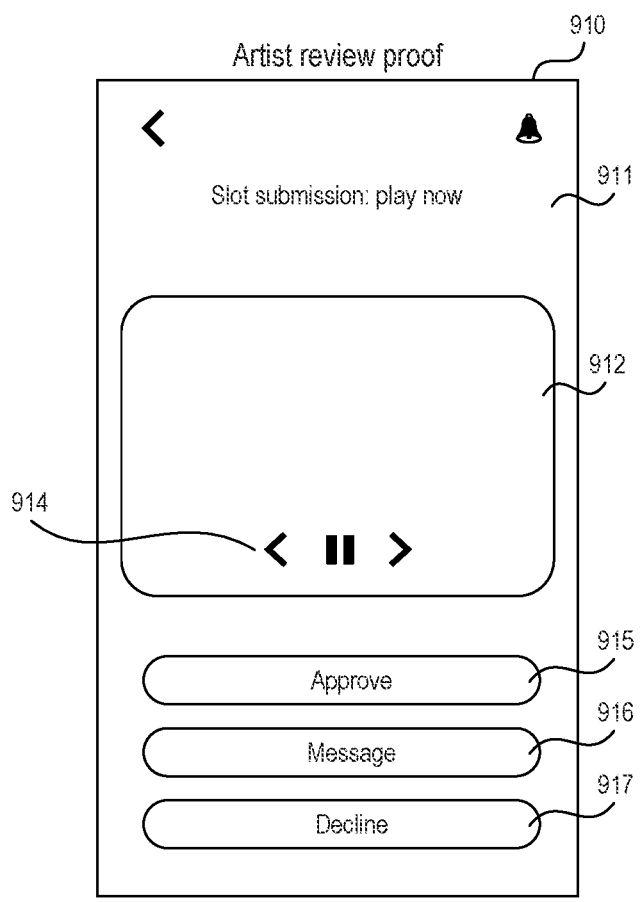
FIG. 9 is a display diagram of an example user interface for an artist's review of a proof of play.

FIG. 9 is a display diagram of an example user interface in the application 132 for the artist to use to review the proof of play and approve or reject the proof of play. As illustrated, the interface provides a review proof page 910 to display the proof to an artist. Review proof page 910 includes textual display region 911 to display a push notification about the proof, instructions associated with the proof review, information and metadata related to the proof, and/or other information. The review proof page 910 also includes playback interface 912, which may be used to review the audiovisual recording using playback buttons 914. As illustrated, review proof page 910 further includes response buttons such as an approve button 915, a message button 916, and a decline button 917. In some embodiments, the message button 916 allows the artist to view messages from the promoter and/or send messages to the promoter regarding the proof of play. If an artist selects the decline button 917, they can be taken to a response page (not shown) to provide information regarding why they declined the proof.

Returning to FIG. 4, in some embodiments, if the artist does not accept or reject the proof of play within a threshold time at function block 425, the system treats the lack of response as an approval. For example, if the artist does not respond to the proof of play within 48 hours of the proof being made available to the artist for review, function block 425 may treat the lack of response as an approval and continue. At decision block 430, if the artist approves the proof of play, processing continues at block 435, otherwise processing continues at block 440. At block 435, the system processes the payment, meaning that the funds are transferred from an escrow account maintained by system to the promoter's recorded payment method (e.g., a provider's bank account). It will be appreciated that the system may maintain an escrow account associated with each artist, or may maintain a single escrow account where funds are deposited and withdrawn as tracks are accepted and played.

If the artist declines the proof, at block 440 the system forwards it to an administrator for review. Function block 445 is executed in conjunction with the administrator application 172 to facilitate the administrator's review of the declined proof of play.

Figure 10:
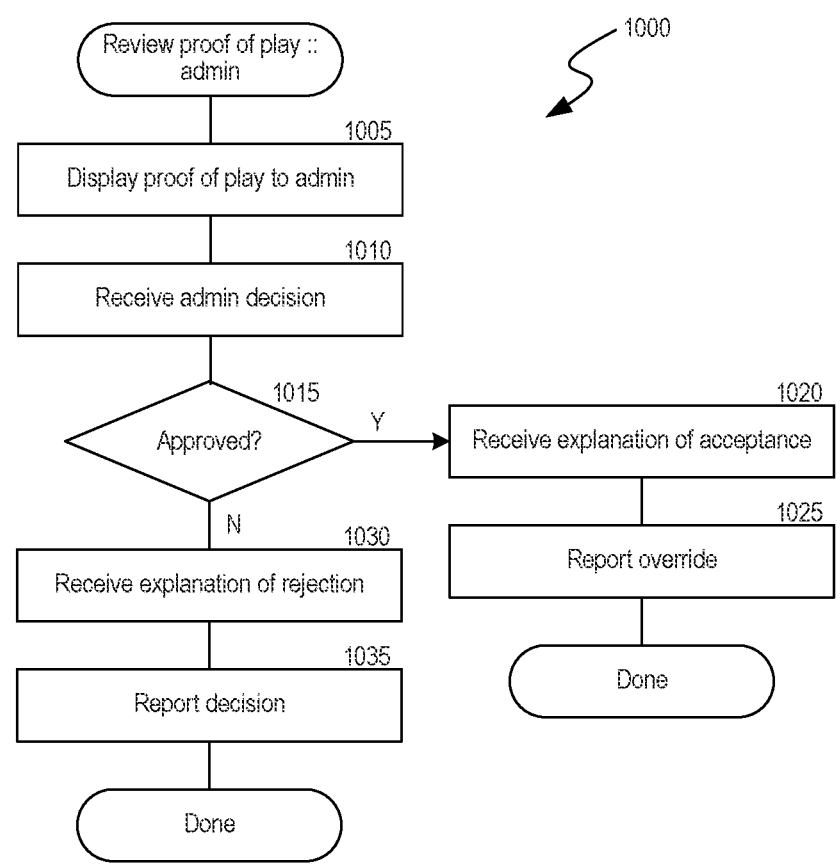
FIG. 10 is a flow diagram of a process for facilitating an administrator's review of a proof of play.

FIG. 10 is a flow diagram of a process 1000 executed by the system to allow an administrator to review a proof of play. The review proof of play process is executed by the application servers 110 in conjunction with the administrator application to facilitate an administrator's review. At block 1005 the system displays the proof of play information to the administrator. The display allows the administrator to review any recordings, metadata associated with the recordings, and/or any other information submitted with the proof of play. In some embodiments, the administrator is allowed to send messages to the promoter and the artist to request additional information about the content, slot, and circumstances of the content's play. At block 1010 the system receives the administrator's decision regarding the proof of play. At decision block 1015, if the proof is approved by the administrator, processing continues at block 1020, otherwise processing continues at block 1030. At block 1020, the system receives an explanation from the administrator explaining why the administrator is approving the proof of play (and thereby overriding the artist's decision). In various embodiments, the explanation can be a textual message, predetermined responses that are selected via a series of prompts, and/or other means of conveying feedback. At block 1025, the system reports the override to the artist and promoter via application 132.

Alternatively, at block 1030 the system receives an explanation from the administrator explaining why the administrator is rejecting the proof of play (and thereby upholding the artist's decision). In various embodiments, the explanation can be a textual message, predetermined responses that are selected via a series of prompts, and/or other means of conveying feedback. At block 1035, the system reports the decision to the artist and promoter via application 132.

Figure 11:
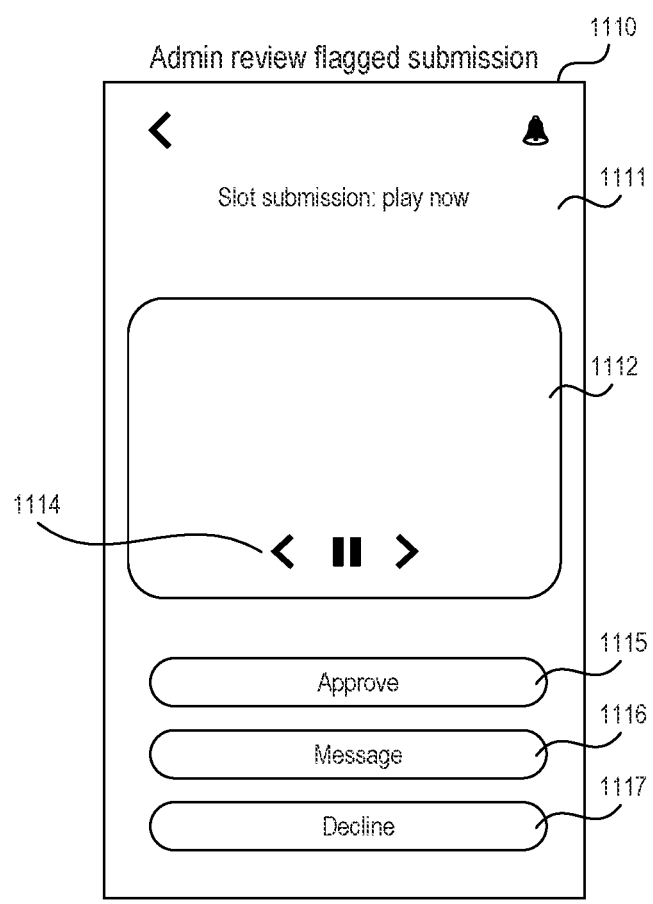
FIG. 11 is a display diagram of an example user interface for the administrator's review of the proof of play.

FIG. 11 is a display diagram of an example user interface that is generated by the system in an administrator application on a smartphone for the administrator to review proof that the promoter presented the artist's content. As illustrated, the interface uses a review proof page 1110 to allow the administrator to review the proof. Review proof page 1110 includes a textual display region 1111, which can display a push notification about the proof, information on the original submission, information and metadata related to the proof, the artist's feedback, and/or other information. The review proof page 1110 also includes video playback interface 1112, which allows the administrator to review an audiovisual recording using playback buttons 1114. As illustrated, review proof page 1110 further includes response buttons such as an accept button 1115, a message button 1116, and a decline button 1117. The message button allows the administrator to view messages from the promoter and/or artist, and/or send messages regarding the proof of play. If an administrator selects the decline button, they can be taken to another page (not shown) to provide an explanation regarding why they declined the proof.

Returning to FIG. 4, processing continues at decision block 450. At decision block 450, if the administrator approved, the system processes payment at block 455, otherwise processing continues at block 460. At block 460 the system refunds the escrowed funds to the artist. That is, because the proof of play was insufficient to prove that the promoter presented the content (e.g., at the appropriate slot), the system returns the amount that the artist was charged for the performance slot.

Figure 13:
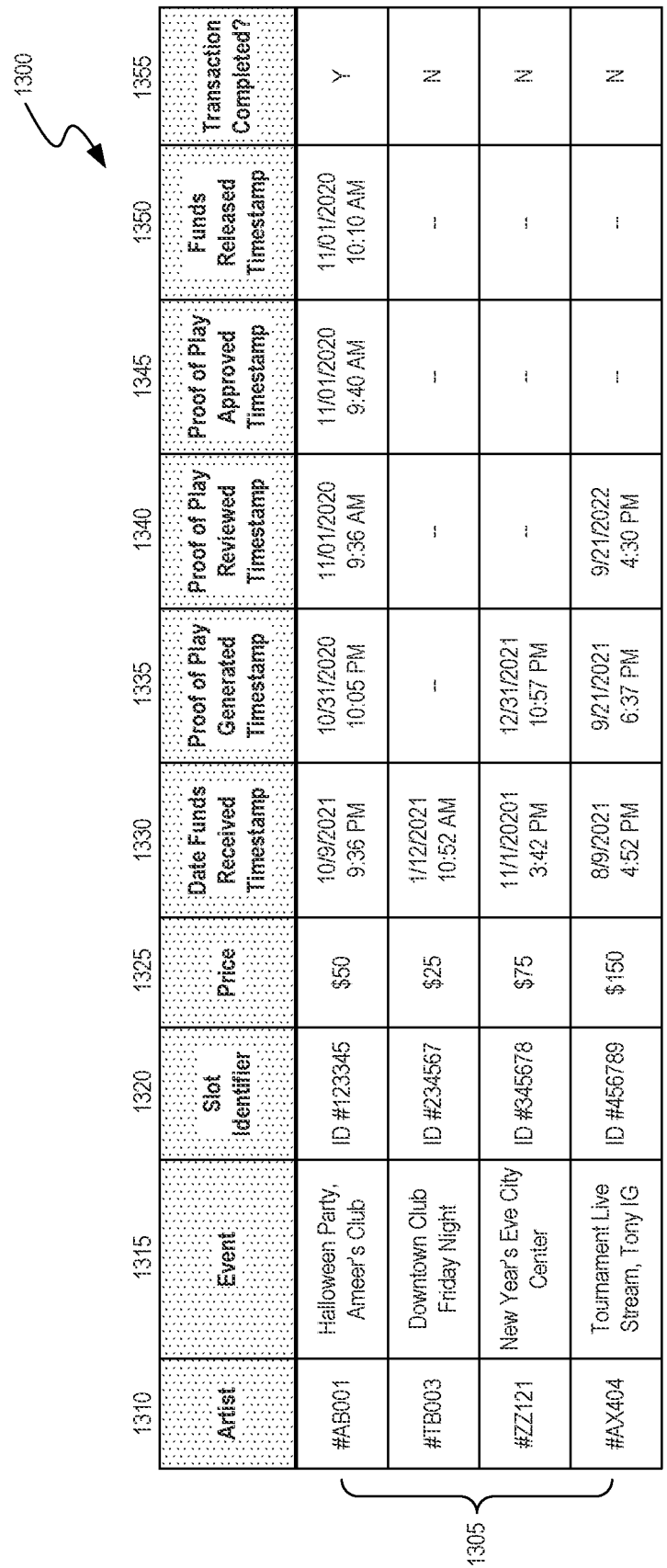
FIG. 13 is a representative table used by the system to track an approval and payment process associated with a content submission.

FIG. 13 is an example of a tracking table 1300 that is maintained by the system to track, among other information, agreed-to slots between promoters and artists, date and amount charged to artists and held in escrow, status of proof of play generation, status of proof of play review, status of proof of play approval, and date and amount paid to the promoter if the approval is received. Each row 1305 of table 1300 reflects an agreement between an artist and a promoter to present content in an available performance slot. Each column in the table contains data characterizing the agreement or tracking the process to ensure performance and payment in accordance with the agreed-to terms. The first four columns of the table characterize the available performance slot and the price associated with that slot. That is, artist column 1310 contains an identifier of the artist from which a promoter has selected content to present during an available slot, event column 1315 identifies the event at which the slot is offered, slot identifier column 1320 contains a unique identifier that identifies the particular slot at the event, and price column 1325 contains the price that is paid by the artist to the promoter to have their digital content presented during the slot. As previously described, the price reflected in column 1325 is collected by the system from the artist and placed in escrow, where the funds remain until the artist or system is satisfied that proof of play has occurred in accordance with the agreed terms. The remaining columns in the table track milestones that are completed before the escrowed amounts are released to the artist. Column 1330 is a timestamp that reflects when the system has collected the agreed-to price and placed the collected amounts into escrow. Columns 1335-1345 contain data tracking the generation and confirmation of the proof of play. Namely, column 1335 contains a timestamp of when the proof of play was generated by the promoter or system, column 1340 contains a timestamp of when the proof of play has been reviewed by the artist and/or system, and column 1345 contains a timestamp of when the proof of play has been approved by the artist and/or system. As previously noted, the system may automatically approve a proof of play under certain conditions, such as if the artist has reviewed the proof of play and failed to take action within a certain period of time (e.g., 48 hours). Once the proof of play has been approved, the system releases the escrowed amounts to the promoter and captures and stores a timestamp reflecting that payment in column 1350. When the performance associated with an agreed-to slot is complete, either by payment of escrowed amounts to the promoter (upon satisfaction of the slot agreement) or refund of the escrowed amounts to the artist (upon a failure to satisfy the slot agreement), the system records that the transaction has been completed in a column 1355.

While FIG. 13 depicts tables whose contents and organization are designed to make them more comprehensible to a human reader, those skilled in the art will appreciate that the actual data structure(s) used by the system to store this information may differ from the table shown, in that the table may be, for example, organized in a different manner, may contain more or less information than shown, may be compressed and/or encrypted, and may be optimized in a variety of ways.

Figure 12:
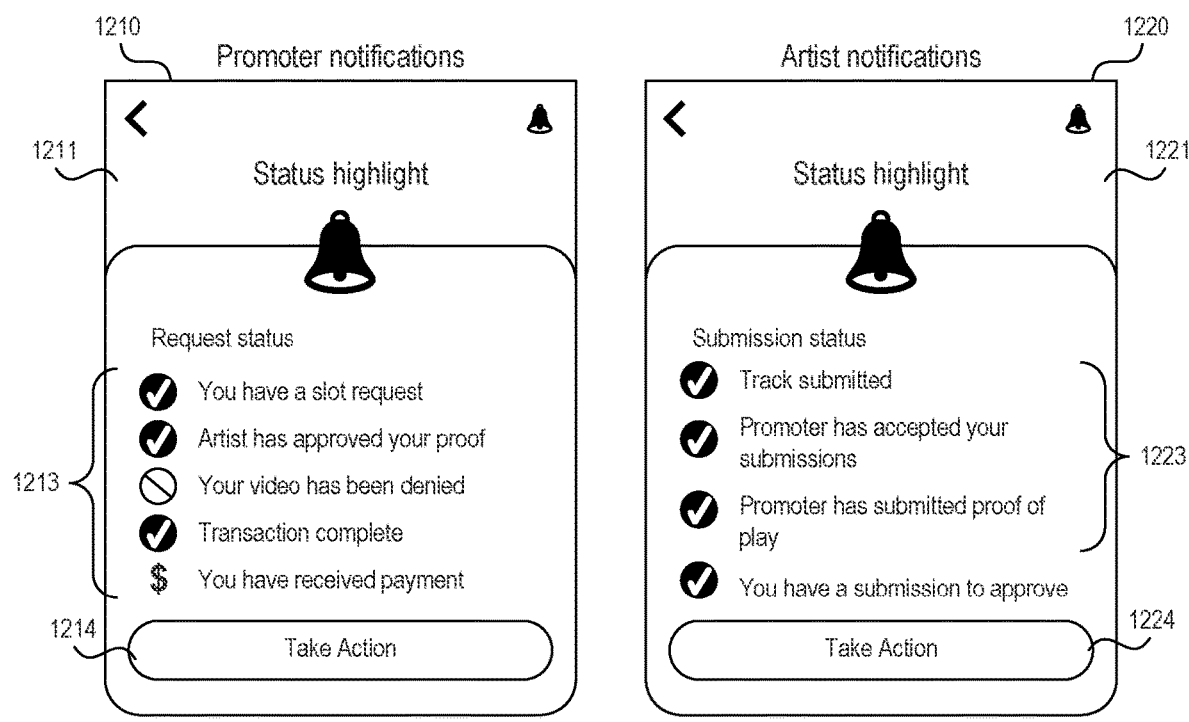
FIG. 12 is a display diagram of additional user interfaces that content promoters and artists may use to interact with the system.

FIG. 12 is a display diagram of additional user interfaces that promoters and artists may use to interact with the system. In this example implementation, promoter notifications page 1210 can be used as a landing page for notifications pushed to promoters. As illustrated, the notifications page 1210 includes a text display region 1211 and a notifications region 1213. The notifications region 1213 provides a status summary of actions associated with available setlist slots, such as whether an artist has submitted a track for consideration or whether an artist has accepted the promoter's proof of play. In some embodiments, the promoter can select one of the status summary notifications and be re-directed to another interface (not shown) related to the notification. The notifications page 1210 can also include button 1214 that links the promoter to an interface (not shown) to create a new setlist, review submissions, review other notifications warranting a response, and/or other interfaces requesting the promoter to act on.

Similarly, an artist notifications page 1220 can be used as a landing page for notifications that are pushed to artists. As illustrated, notifications page 1220 includes a text display region 1221 and a notifications region 1223. The notifications region 1223 provides a status summary of actions of interest to the artist, including whether the promoter has accepted an artist submission or has provided a proof of play to the artist. In some embodiments, the artist can select one of the status summary notifications and be re-directed to another interface (not shown) related to the notification. The notifications page 1220 can also include button 1224 that links the artist to an interface (not shown) to upload tracks, search for setlist slots, create submissions, respond to submitted proof, and/or other interfaces requesting the artist to act on.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method performed by a computing system for facilitating content promotion transactions between artists and content promoters, the method comprising:
   receiving, by a computing system, transaction information comprising:
      an artist submission, the artist submission including digital media content associated with an artist,
      event information associated with an event in which a content promoter will be participating, the event information including information about a slot at the event during which the content promoter has agreed to present the digital media content, and
      a price at which the content promoter has agreed to present the digital media content during the slot at the event;
   receiving, from the artist, payment of the price associated with the presentation of the digital media content;
   holding the received payment in an escrow account;
   verifying proof of play information, the proof of play information including an indication that the digital media content has been presented during the slot at the event,
      wherein the proof of play information is received by the computing system from the content promoter, the content promoter generating the proof of play via an application or interface configured to generate an indication that the digital media content has been presented,
      wherein the proof of play information includes a video of the presentation of the digital media content and metadata comprising at least one of a time, a date, or a geolocation, the metadata being captured by the application or interface,
      wherein the proof of play information is stored by the computing system for subsequent access by the artist, and
      wherein verifying the proof of play information comprises:
         transmitting an electronic message to the artist by the computing system, the electronic message containing a link at which the artist can review the proof of play information to confirm that the digital media content has been presented during the slot and a date by which review of the proof of play information must be completed;
         receiving, from the artist, an indication that the artist does not approve the proof of play information;
         in response to the received indication that the artist does not approve the proof of play information, providing the proof of play information to an administrator for review; and
         before remitting the received payment to the content promoter, receiving an indication from the administrator that the proof of play information is approved; and
   remitting the received payment to the content promoter from the escrow account following verification of the proof of play information.

2. The method of claim 1, wherein the digital media content is a music track.

3. The method of claim 2, wherein the event includes performance of a setlist that includes the slot during which the content promoter has agreed to present the digital media content, and wherein the content promoter is a disc jockey.

4. The method of claim 1, wherein the event information includes a time for the slot at the event during which the content promoter has agreed to present the digital media content, the method further comprising:
   providing, to the content promoter, the digital media content associated with the artist; and
   transmitting, to the content promoter, a reminder notification to present the digital media content during the slot at the event.

5. The method of claim 1 wherein the proof of play information comprises an audiovisual recording of at least some of the digital media content being presented during the event.

6. The method of claim 1, wherein the proof of play information comprises a uniform resource locator (URL) at which information about the event can be accessed.

7. The method of claim 1, wherein the proof of play information comprises an indication from the artist that the digital media content has been presented during the slot at the event.

8. The method of claim 1, further comprising:
   providing, to the artist, the proof of play information for review; and
   receiving, from the artist and before remitting the received payment to the content promoter, an indication that the proof of play information is approved.

9. The method of claim 1, wherein the proof of play information is automatically generated by the computing system.

10. A non-transitory computer-readable medium carrying instructions that, when executed by a computing system, cause the computing system to perform operations comprising:
   receiving, by a computing system, transaction information comprising:
      an artist submission, the artist submission including digital media content associated with an artist,
      event information associated with an event in which a content promoter will be participating, the event information including information about a slot at the event during which the content promoter has agreed to present the digital media content, and
      a price at which the content promoter has agreed to present the digital media content during the slot at the event;

receiving, from the artist, payment of the price associated with the presentation of the digital media content;

holding the received payment in an escrow account;

verifying proof of play information, the proof of play information including an indication that the digital media content has been presented during the slot at the event, wherein the proof of play information is received from the content promoter by the computing system, the content promoter generating the proof of play information via an application or interface configured to generate an indication that the digital media content has been presented, wherein the proof of play information includes a video of the presentation of the digital media content and metadata comprising at least one of a time, a date, or a geolocation, the metadata being captured by the application or interface, wherein the proof of play information is stored by the computing system for subsequent access by the artist, and wherein verifying the proof of play information comprises:

transmitting an electronic message to the artist by the computing system, the electronic message containing a link at which the artist can review the proof of play information to confirm that the digital media content has been presented and a date by which review of the proof of play information must be completed;

receiving, from the artist, an indication that the artist does not approve the proof of play information;

in response to the received indication that the artist does not approve the proof of play information, providing the proof of play information to an administrator for review; and before remitting the received payment to the content promoter, receiving an indication from the administrator that the proof of play information is approved; and remitting the received payment to the content promoter from the escrow account following verification of the proof of play information.

11. The non-transitory computer-readable medium of claim 10, wherein the digital media content is a music track, and the content promoter is a disc jockey, and wherein the event includes performance of a setlist that includes the slot during which the content promoter has agreed to present the digital media content.

12. The non-transitory computer-readable medium of claim 10, wherein the event information includes a time for the slot at the event during which the content promoter has agreed to present the digital media content, the operations further comprising:

providing, to the content promoter, the digital media content associated with the artist; and transmitting, to the content promoter, a reminder notification to present the digital media content during the slot at the event.

13. The non-transitory computer-readable medium of claim 10, wherein the operations further comprise:

providing, to the content promoter, the application or interface configured to generate the indication that the digital media content has been presented, wherein the proof of play information comprises an audiovisual recording of at least some of the digital media content being presented during the event; and receiving, from the content promoter, the proof of play information.

14. The non-transitory computer-readable medium of claim 10, wherein the proof of play information comprises a uniform resource locator (URL) at which information about the event can be accessed.

15. The non-transitory computer-readable medium of claim 10, wherein the proof of play information comprises an indication from the artist that the digital media content has been presented during the slot at the event.

16. The non-transitory computer-readable medium of claim 10, wherein the operations further comprise:

providing, to the artist, the proof of play information for review; and receiving, from the artist and before remitting the received payment to the content promoter, an indication that the proof of play information is approved.

17. The non-transitory computer-readable medium of claim 10, wherein the proof of play information is automatically generated by the computing system.

* * * * *